3,401,224
TREATMENT OF DEPRESSION WITH N-BENZYLPIPERAZINE

Paul Anthony Barrett, Albert Gordon Caldwell, and Leslie Percy Walls, all of 183–193 Euston Road, London NW. 1, England
No Drawing. Continuation-in-part of application Ser. No. 463,878, June 14, 1965. This application Dec. 29, 1966, Ser. No. 605,543
4 Claims. (Cl. 424—250)

ABSTRACT OF THE DISCLOSURE

A method for the treatment of a mammal or warm blooded animal suffering from a depressed state, comprising administering to the mammal or warm blooded animal an effective amount of N-benzylpiperazine or pharmaceutically acceptable salt thereof.

---

This application is a continuation-in-part of Ser. No. 463,878, filed June 14, 1965, and now abandoned.

The present invention is concerned with pharmacologically valuable compounds and compositions containing them. More particularly, this invention is directed to methods of treating warm blooded animals or mammals suffering from a depressed state.

1-methylphenethylamine (amphetamine), $\alpha,\alpha$-diphenyl-2-piperidinomethanol (pipradol) and 5-(2-dimethylaminopropyl) - 10,11 - dihydro-5-H-dibenz azepine hydrochloride (imipramine) are all well known chemical compounds frequently used in medical practice for the treatment of depressed states. Amphetamine has been known since 1931 and is a sympathomimetic agent employed mainly as a stimulant to the central nervous system, for example in narcolepsy, alcoholism, mental depression, post-encephalitic parkinsonism, barbiturate and morphine poisoning, and general fatigue; it is also used to treat spasms of the gastro-intestinal tract, dysmenorrhea, hypotension and anaesthetic collapse, and to produce anorexia in obesity. Pipradrol, known since 1953, is also a stimulant to the central nervous system and is used principally for the treatment of emotional fatigue and mild depression. Similarly, imipramine, which has been known since 1951, is useful for depressive states.

However, none of these compounds is entirely satisfactory in medical practice. Amphetamine can over-stimulate and often causes insomnia, hypertension, tachycardia, palpitations, arrhythmia, nervousness, dyspnoea, anorexia, headaches and diarrhoea or constipation; in overdoses it may also cause hallucinations, delerium, peripheral vascular collapse and death. Similarly, pipradol and imipramine can over-stimulate. Pipradol often causes insomnia and nervousness and, in overdoses, tachycardia, hypertension, tremors and convulsions; while imipramine causes mental excitement, blurring of vision, tachycardia, xerostomia, parasthesias and skin rashes. Moreover, imipramine is teratogenic.

Partly in attempts to overcome these various difficulties, mono-amine oxidase inribitors such as phenelzine-($\beta$-phenylethylhydrazine) and "Actomol" ($\alpha$-methylbenzylhydrazine) have been much investigated and developed in recent years and are now used for, among other things, the treatment of depressed states. Nevertheless, they are also not entirely satisfactory, each example having a number of disadvantages, such as toxic effects on the liver, postural hypotension, giddiness and hypertensive crises.

It has now been found that N-alkylpiperazines of the general formula:

(I)

(wherein R is the phenyl or 2-thienyl group, and alk is a straight or branched alkylene chain having from 1 to 6 carbon atoms) have improved pharmacological characteristics, especially as anti-depressants and central stimulants. Their activity is significantly more moderate than those of amphetamine and pipradrol, and some of the disadvantageous side effects of these compounds, imipramine and mono-amine oxidase inhibitors are reduced or absent.

Accordingly, the present invention provides a process for the treatment of a depressed state, cold, or headache, which comprises administering an N-alkylpiperazine of the general Formula I.

Desirably, the N-alkylpiperazine is in the form of a derivative suitable for pharmaceutical presentation and, in general, will be an acid addition salt, preferably water soluble, for example, a hydrochloride, dihydrochloride or neutral tartrate. Nevertheless, it may be the base itself, or even another chemical compound formed with the N-alkylpiperazine. Thus, it may be any compound which provides the N-alkylpiperazine and it has been found that formaldehyde-condensation products, that is, methylene-bis ($N^1$-alkylpiperazines) wherein each alkyl group is an R-Alk-group as defined hereinbefore, are particularly suitable in this respect.

As a matter of practice, it is particularly preferred that the N-alkylpiperazines of the general Formula I and also the derivatives thereof, are formed into pharmaceutical compositions by association with suitable pharmaceutical vehicles before they are administered.

The term "pharmaceutical vehicle" is used herein to cover the wide variety of modes of presentation which may be adapoted with the defined compounds and is qualified with the term "pharmaceutical" so as to exclude any possibility that the nature of the compositions, considered of course in relation to the route by which they are intended to be administered, could be harmful rather than beneficial.

Without detraction from the generality of the foregoing definition of the term "pharmaceutical vehicle," it can be stated for purposes of guidance that, subject always to the exclusion of ingredients of a toxic or otherwise noxious nature or which would interfere with the pharmacological actions of the N-alkylpiperazines, the term may be regarded as having the following particular meanings in relation to the usual modes of administration identified below:

(a) So far as oral administration is concerned, the term means the ingestible coherent solid excipient of a tablet, coated tablet, pill or sublingual tablet, the ingestible container of a capsule or cachet, the ingestible and usually flavored pulverulent solid carrier of a powder or granules, or the usually flavored ingestible aqueous or non-aqueous liquid medium of a syrup or elixir. In general, the vehicle will be a diluting, dispersing, surface active, suspending, binding, lubricating, flavoring, preserving, thickening or emulsifying agent.

(b) So far as administration by injection is concerned, the term means a sterile injectable liquid solution or suspension medium, preferably isotonic with the body fluids encountered in the vicinity of the intended site of injection. In general, the vehicle will be an anti-oxidant, buffer, bacteriostat, solute which renders the composition isotonic with said body fluid, suspending agent or thickening agent. Moreover, an extemporaneous injection solution or suspension may be prepared from sterile powders, granules or tablets.

(c) So far as administration rectally is concerned, the term means a base material of low melting point, capable of releasing the N-alkylpiperazine to perform its pharmacological function, which base material when appropriately shaped forms a suppository.

While the modes of presentation just listed represent those most likely to be employed, they do not necessarily exhaust the possibilities. However, the preferred methods of administering the N-alkylpiperazines are orally and parenterally and the preferred modes of presentation are thus in the form of injectable solutions or suspensions dispensed in single-dose ampoules or multi-dose phials, and in the form of tablets, powders, sublingual tablets, capsules and cachets. The particularly preferred method of administration is orally.

It will be understood that the absolute quantity present in any discrete dosage unit should not exceed that appropriate to the rate and manner of administration to be employed yet, on the other hand, should also desirably be adequate to allow the desired rate of administration to be achieved by a small number of dosage units, preferably a single one. The average rate of administration will, moreover, depend in particular on the actual N-alkylpiperazine being presented and on the pharmacological action desired. Nevertheless, in general, it may be said that the preferred dosage range for an adult mammal is from 1 to 100 mg., especially 2.5 to 50 mg. per dose administered desirably at the most three times a day, though the range may be extended as high as 200 mg., or even 500 mg.

The N-(2-thienylalkyl)piperazines of the general Formula I when R is the 2-thienyl group, and the derivatives thereof, are novel compounds and may themselves conveniently be prepared by any of the processes well known for the preparation of N-alkyl-piperazines and derivatives thereof.

A particularly preferred process for the preparation of the novel thienyl compounds comprises reacting a 2-thienylalkyl halide, desirably the chloride or bromide, with piperazine. Preferably, the reaction is performed in an alkanol such as ethanol, usually at an elevated temperature.

As another example, the novel thienyl compounds may be prepared by reacting an N-(2-thienylalkyl)-$N^1$-(acyl or alkoxycarbonyl)piperazine with an acid or alkali under such conditions as to cause cleavage of the acyl or alkoxycarbonyl group from the nitrogen atom with consequent formation of the corresponding N-(2-thienylalkyl)piperazine. The concentration of the acid or alkali, and the temperature and time of the reaction, to be used will depend principally on the nature of the acyl or alkoxycarbonyl group to be removed.

The N-(2-thienylalkyl) - $N^1$ - (acyl or alkoxycarbonyl) piperazine starting material is itself desirably prepared in a preliminary stage by reacting a 2-thienylalkyl halide, such as the chloride or bromide, with the corresponding piperazine derivative, such as N-ethoxycarbonylpiperazine or N-formylpiperazine. The reaction is conveniently carried out in a solvent, for example, benzene or acetone, desirably in the presence of an acid binding agent, for example, sodium carbonate or an excess of the piperazine component, preferably at an elevated temperature.

The product formed by any of the above described reactions will be the desired N-(2-thienylalkyl)piperazine, in the form of the base or an acid addition salt thereof, and may then be converted into, respectively, an acid addition salt or a salt of another acid by reaction with an acid or salt thereof, for example, on an ion exchange column or in solution. Moreover, it may be converted into any other derivative by appropriate reaction. Thus, reaction with formaldehyde produces the corresponding methylene-bis-[$N^1$-(2-thienylalkyl)piperazine].

N-benzylpiperazine was tested on three pharmacologically induced depressed states brought about by the administration of tetrabenzene, reserpine and chlorpromazine. Mice were administered the aforementioned tetrabenzene, reserpine and chlorpromazine and were then administered N-benzylpiperazine. It was found that N-benzylpiperazine in doses ranging from 40 mg./kg. to 100 mg./kg. brought about a reversal in the depressed states caused by the administration of the aforementioned depression-producing drugs.

Additionally, N-benzylpiperazine was tested in rats to determine its ability to reverse pharmacologically-produced depression. It was found that N-benzylpiperazine was effective to reverse the effects of chlorpromazine in doses of 10 mg./kg. when given by a stomach tube.

Furthermore, N-benzylpiperazine was tested on guinea pigs, rabbits, cats, dogs and monkeys. With a monkey which had been treated with tetrabenzene to induce depression, it was found that at doses of 20 mg./kg. and 30 mg./kg.-body weight, normal behavior was restored.

In order that the invention may be more fully understood, it will now be described, though only by way of illustration, with reference to the following examples.

EXAMPLE 1

Tablets of N-benzylpiperazine salts

Tablets of N-benzylpiperazine hydrochloride, dihydrochloride, or neutral tartrate are prepared in the following manner:

| | Per tablet, mg. |
|---|---|
| Active ingredient | 5–20 |
| Potato starch | 20 |
| Lactose | 160 |
| Magnesium stearate | 2 |

The active ingredient is mixed with the lactose and potato starch in a ball-mill and the resulting powder is granulated with a 10% solution of gelatin in aqueous alcohol. The granules are then sifted through a 20 mesh sieve, dried at 50° C. and again sifted through a 20 mesh sieve. The magnesium stearate is then sifted through a 100 mesh sieve onto the granules and the whole is thoroughly mixed. After this, it is compressed on a suitable die size into tablets, which may be scored and contain from 5 to 20 mg. of active ingredient.

EXAMPLE 2

Tablets of methylene-bis-($N^1$-benzylpiperazine)

Tablets containing from 5 to 20 mg. of methylene-bis-(N-benzylpiperazine) instead of that amount of N-benzylpiperazine salt are prepared in a manner exactly the same as that described in Example 1 above.

EXAMPLE 3

N-benzylpiperazine neutral tartrate

A warm filtered solution of tartaric acid (15.0 g.) in water (100 ml.) is added to a solution of N-benzylpiperazine (17.6 g.) in ethanol (50 ml.). The mixture is evaporated to dryness in vacuo and the residual semi-solid tartrate is recrystallized from ethanol containing a little water, to give N-benzylpiperazine neutral tartrate as colorless crystals, M.P. 152° C. after drying in vacuo and at 100° C.

EXAMPLE 4

N-(2-thenyl)piperazine base and dihydrochloride 2-thenyl chloride (prepared by the method of "Organic Syntheses," Coll. vol. III, 197 (1955)) (44 g.) is added dropwise to a stirred solution of piperazine hexahydrate (65 g.) and piperazine dihydrochloride monohydrate (59 g.) in ethanol (135 ml.), maintained at 65° C. in a water-bath. The solution is stirred for 30 minutes after completion of the addition and is then cooled in an ice-bath. The solid is filtered off and washed with alcohol. The filtrate is evaporated to dryness and the residue is distilled, the N-(2-thenyl)piperazine being collected at 136–148° C./13 mm. The base forms a dihydrochloride which crystallizes from methanol in colorless needles, M.P. 230° C. (decomp.).

EXAMPLE 5

Methylene-bis-[$N^1$-(2-thenyl)piperazine]

A mixture of 1-(2-thenyl)piperazine (5 g.) and formalin (5 ml. of 36%) is allowed to stand at room temperature for 16 hours. Water is then added to precipitate a gum which soon solidifies. The solid is recrystallized from acetone to give methylene-bis-[$N^1$-(2-thenyl)piperazine] as stout needles M.P. 107–108° C.

What is claimed is:

1. A method for the treatment of a mammal suffering from a depressed state, comprising administering to said mammal an effective amount of N-benzylpiperazine.

2. A method according to claim 1, in which N-benzylpiperazine is administered in a quantity of 1 to 500 mg.

3. A method for the treatment of a mammal suffering from a depressed state, comprising administering to said mammal an effective amount of a pharmaceutically acceptable salt of N-benzylpiperazine.

4. A method according to claim 3, in which the pharmaceutically acceptable salt of N-benzylpiperazine is administered in a quantity of 1 to 500 mg.

References Cited

Derwent-Farmdoc, 10,989, Abstracting Belgium Pat. No. 635,905 (Aug. 6, 1963).

ALBERT T. MEYERS, *Primary Examiner.*

S. FRIEDMAN, *Assistant Examiner.*